United States Patent Office 3,787,466
Patented Jan. 22, 1974

3,787,466
N-ACETYL-L-GLUTAMINE ALUMINUM SALT
Tsuneo Kagawa, Tokyo, Kyoichi Fuji, Sakai, and Masao Tanaka and Hiroshi Tanaka, Sunto, Japan, assignors to Kyowa Hakko Kogyo Co., Ltd., Tokyo, Japan
No Drawing. Filed June 2, 1971, Ser. No. 149,336
Claims priority, application Japan, June 5, 1970, 45/48,031
Int. Cl. C07f 5/06
U.S. Cl. 260—448 R          3 Claims

ABSTRACT OF THE DISCLOSURE

Aluminum salts of N-acetyl-L-glutamine are prepared by reacting N-acetyl-L-glutamine with an aluminum alkoxide in water. The aluminum salts are useful in the treatment of gastric ulcers.

---

This invention relates to a method for preparing novel compounds which are aluminum salts of N-acetyl-L-glutamine. The novel N-acetyl-L-glutamine aluminum salts of the present invention exhibit excellent therapeutic effects in the treatment of gastric ulcers.

The N-actyl-L-glutamine aluminum salts are a kind of organic acid salt, but N-acetylglutamine exhibits such strikingly different properties from the ordinary organic acids that it is difficult to prepare the aluminum salts according to the usual methods for preparing salts of organic acids.

N-acetyl-L-glutamine is a solid having a high melting point, and there are few solvents in which the acid is very soluble. As seen from its structure, N-acetyl-L-glutamine is unstable to heat, strong acid and strong alkali. In addition, the aluminum salt of N-acetyl-L-glutamine is highly soluble in water.

Therefore, the usual methods employed in the synthesis of an aluminum salt of an organic acid, such as (1) heating an organic acid with aluminum or alumina, (2) the double decomposition of an alkali salt of an organic acid and an aluminum salt in an aqueous solution to precipitate an aluminum salt of the organic acid, (3) the reaction of an organic acid and an aluminum alkoxide in an inert solvent such as alcohol, etc., are not applicable in the preparation of the aluminum salts of N-acetyl-L-glutamine. Further, the preparation of aluminum salts by heating an organic acid with aluminum hydroxide is not practical since it is difficult to prepare an aluminum salt of high quality suitable for medical and pharmaceutical purposes. This is due to the fact that it is difficult to prepare alumina and aluminum hydroxide samples which do not contain other inorganic salts on an industrial scale.

The present invention relates to a novel synthetic method for preparing aluminum salts of N-acetyl-L-glutamine having a high degree of purity and which are suitable for medical and pharmaceutical purposes.

By means of the present invention an aluminum salt of N-acetyl-L-glutamine having the desired degree of quality can be synthesized by allowing N-acetyl-L-glutamine to react with an aluminum alkoxide in the presence of a large amount of water. The actual volume of water used will depend upon the amount of N-acetyl-L-glutamine employed in the reaction. The aluminum salt is obtained by crystallization from the aqueous solution.

Included among the aluminum salts of N-acetyl-L-glutamine, are the salts which form at various stages during the reaction and have varying molar ratios of N-acetyl-L-glutamine to aluminum. This is also the case with aluminum salts of ordinary organic acids. When the present method is employed, salts having a molar ratio of N-acetyl-L-glutamine to aluminum of from 1:1 to 3:1 can be prepared merely by changing the molar ratio of N-acetyl-L-glutamine to aluminum alkoxide. The resulting composition can be represented by the formula:

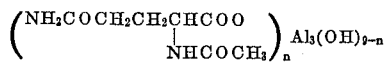

wherein $n$ is a number from 3 to 9.

The preferred solvent for the reaction is water or a mixture of water and a water-miscible organic solvent. Organic solvents such as acetone or lower alkanols such as methanol, ethanol, and propanol may be employed. The salt is prepared by reacting an aluminum alkoxide, either as a solid or as an alcoholic solution, with an aqueous solution of N-acetyl-L-glutamine. The reaction is carried out with stirring.

Any suitable aluminum alkoxide may be employed in the reaction such as, for example, lower alkoxides such as aluminum methoxide, aluminum ethoxide, aluminum tert-butoxide, and aluminum isopropoxide and corresponding alkoxides containing up to about six carbon atoms in the alkyl group.

The molar ratio of the reactants, i.e., N-acetyl-L-glutamine to aluminum alkoxide can be varied with a desired composition of the product, and a ratio of from about 1:1 to about 3:1 is ordinarily employed. But the quantity of the aluminum alkoxide as the reactant depends on its purity and is desirable to be used slightly excessive than that calculated. The excess of from 2 to 6% is usually preferable. When impurities such as polymers of aluminum hydroxide are present in the alkoxide, it is preferred to separate them by distillation before the aluminum alkoxide is added to the N-acetyl-L-glutamine solution or by filtration after the reaction completed.

When the solvent employed for the reaction is water or a solution comprised mostly of water, the reaction between the aluminum alkoxide and N-acetyl-L-glutamine takes place quickly resulting in a solution of the N-acetyl-L-glutamine aluminum salt. The reaction can be carried out at a temperature ranging from the room temperature to about 80° C.

The crystalline-like N-acetyl-L-glutamine aluminum salt can be obtained by concentrating the reaction mixture and drying the resultant solution of the salt into a dry mass or by precipitating the salt out of solution by the addition of a solvent such as alcohol or acetone in which the salt is insoluble to the concentrated solution.

The aluminum salts of N-acetyl-L-glutamine are useful for medicinal purposes as evidenced by the excellent results obtained in the antiucler action test carried out on experimental animals to test the effect of the salt on experimentally induced gastric ulcers resulting from various causes such as, for example, the reserpine ucler, the stress induced ulcer, the cortisone ulcer, the histamine ulcer, the ulcer on Shay rat, the acetic acid ulcer, and the clamping cortisone ulcer. In addition, the aluminum salts show low toxicity in the safety test.

The aluminum salts of N-acetyl-L-glutamine can be used in the treatment of gastric ulcers or they may be used for a prevention of gastric ulcer. The salts can be administered orally, subcutaneously, intraperitioneally or intravenously. Good results are obtained when the salts are administered at dose levels ranging from 0.5 gm. to 2 gm./kg. per day but, since the salts have low toxicity, larger doses may be administered in severe cases. Any pharmaceutically acceptable carrier such as, for example, mannitol, lactose and the like may be employed to administer the salts.

Now, the present invention will be explained in detail, referring to examples, but the present invention is not limited thereto.

EXAMPLE 1

A mixture of 47.0 g. of N-acetyl-L-glutamine and 600 ml. of water is heated to 60° C., and 32.6 g. of aluminum isopropoxide is added to the warm mixture with stirring. The stirring is continued for 30 minutes. The reaction mixture is filtered and the filtrate is concentrated and dried to a mass under reduced pressure. After drying, the crystalline-like aluminum salt of N-acetyl-L-glutamine (53.8 g.) is obtained.

Analytical values are shown in the following table.

| Item | Actual value | Value calculated as $\left(\begin{array}{c}NH_2COCH_2CH_2CHCOO\\ \vert\\ NHCOCH_3\end{array}\right)_5 Al_3(OH)_4$ |
|---|---|---|
| Aluminum, percent | 7.35 | 7.46 |
| Total nitrogen, percent | 12.7 | 12.9 |
| Amide state nitrogen, percent | 6.4 | 6.5 |

EXAMPLE 2

A mixture of 37.6 g. of N-acetyl-L-glutamine and 1000 ml. of water is heated to 40° C., and 900 ml. of an isopropanol solution containing 40.8 g. of aluminum isopropoxide is added to the warm mixture with stirring. The stirring is continued for 10 minutes. The reaction mixture is filtered and the filtrate is concentrated under reduced pressure. Isopropanol is added to the aqueous solution and the salt precipitates in the solution. The precipitates are collected by filtration and upon drying, 48.5 g. of the crystalline-like aluminum salt of N-acetyl-L-glutamine are obtained.

Analytical values are given below.

| Item | Actual value | Value calculated as $\left(\begin{array}{c}NH_2COCH_2CH_2CHCOO\\ \vert\\ NHCOCH_3\end{array}\right)_5 Al_3(OH)_4$ |
|---|---|---|
| Aluminum, percent | 10.5 | 10.9 |
| Total nitrogen, percent | 11.4 | 11.28 |
| Amine state nitrogen, percent | 5.7 | 5.64 |

EXAMPLE 3

The N-acetyl-L-glutamine aluminum salts prepared by the methods of Examples 1 and 2 respectively are examined for toxicity using dd-strain mice, Wistar-strain rats and rabbits. The experimental results on the compound prepared by the method of Example 1 are given in the following table, and the compound prepared by the method of Example 2 is found to have almost the same toxicity as that of the former compound. The compounds are dosed orally, subcutaneously, intraperitoneally, and intravenously. The toxicity is indicated as 50% lethal dose (g.) per weight (kg.) of the animal ($LD_{50}$) calculated by Van der Waerden's method.

TABLE

| Animal | Method of administration | Sex | $LD_{50}$ g./kg. |
|---|---|---|---|
| Mouse | Orally | M | 14.3 |
|  |  | F | 13.1 |
|  | Subcutaneously | M | >0.12 |
|  |  | F |  |
|  | Intraperitoneally | M | 5.0 |
|  |  | F | 4.8 |
|  | Intravenously | M | 0.46 |
|  |  | F |  |
| Rat | Orally | M | >14.5 |
|  |  | F | >14.5 |
|  | Subcutaneously | M | >10.5 |
|  |  | F | >10.5 |
|  | Intraperitoneally | M | 4.2 |
|  |  | F | 3.5 |
|  | Intravenously | M | 0.40 |
|  |  | F | 0.40 |
| Rabbit | Orally | M | 7.5 |
|  |  | F |  |

As shown in the table, the toxicity varies slightly depending upon the method of administration and the kind of animal used, but in all cases, low toxicities are indicated. When the administration of the salt was continued for long periods, no abnormalities were observed during the hematological and pathological examinations.

The post examination did not reveal any tendency to cause deformities in the test animal.

EXAMPLE 4

The N-acetyl-L-glutamine aluminum salt obtained by the method of Example 1 is examined for its effect on stress induced ulcers in rats.

Ten male rats weighing 250±10 g. which have been fasted overnight are confined in stress cages and are immersed into water at a temperature of 22°±1° C. from the neck down for 7 hours. Gastric ulcers are induced in 100% of the rats. The thus induced ulcers are treated with the aluminum salt of N-acetyl-L-glutamine.

The compound is administered to the rats orally just before they are subjected to stress. After the rats have been treated with the aluminum salt, their stomachs are cut open along the greater curvature and areas of lesion are measured. The inhibition rate (percent) is calculated by comparing the values thus measured.

This examination is carried out with groups each of which contained ten rats. The formation of ulcers is completely inhibited by administering 0.5–2 g. of the compound per kg. of each rat.

When the above experiment is repeated using the compound prepared by the method of Example 2, similar results are obtained.

EXAMPLE 5

Aluminum salts of N-acetyl-L-glutamine prepared by the methods of Examples 1 and 2 are examined for their effect on reserpine ulcers and histamine ulcers in rats.

In the case of reserpine ulcers, male rats weighing 150±10 g. which have been fasted for 48 hours are injected with 8 mg./kg. of reserpine intraperitoneally and are left for 18 hours. As a result of this treatment, gastric ulcers form. In the case of histamine ulcers, 300 mg./kg. of histamine, instead of reserpine, are injected intraperitoneally and the rats are left for 4 hours. As a result of this treatment, gastric ulcers are formed. The effect of each compound is indicated by the percent of inhibition of ulcer formation, which is calculated by comparison of (A) the ulcerous area of the rat given the compound orally before ulcerogenic agent is administered and (B)

the ulcerous area of the control rat not given the compound. The results are given in the following table.

TABLE

| Experimental ulcer | Dose, g./kg. | Rate of inhibition of ulcer formation (percent) | |
|---|---|---|---|
| | | I [1] | II [2] |
| Reserpine ulcer: | | | |
| (1) | 2.0 | 88 | 85 |
| (2) | 1.0 | 75 | 72 |
| (3) | 0.5 | 38 | 26 |
| Histamine ulcer: | | | |
| (1) | 2.0 | 75 | 74 |
| (2) | 1.0 | 50 | 51 |
| (3) | 0.5 | 27 | 22 |

[1] The compound prepared by the method of Example 1.
[2] The compound prepared by the method of Example 2.

EXAMPLE 6

The compound prepared by the method of Example 1 is examined for its effect on the pylorus ligated ulcer.

Male rats weighing 200–250 g. which have been fasted for 48 hours are anesthesized after which the pylorus of each rate is ligated. The rats are then left without water or food for 18 hours, after which their stomachs are cut open along the greater curvature to observe the ulcers formed therein. The thus induced ulcers are used to decide the effect of the aluminum salt.

It is found that, in the groups which were orally administered 0.5–1.0 g./kg. of the compound ulcer formation is completely inhibited.

EXAMPLE 7

Aluminum salts of N-acetyl-L-glutamine prepared by the method of Example 1 are examined for its remedial effect on acetic acid ulcers in rats.

Ten male rats per one group weighing 230±10 g. which have been fasted overnight are injected with 0.05 ml. of 30% acetic acid aqueous solution into the serous membrane and the incision is stitched. From the day after operation food is given and constant quantities of the sample are administered to the rats orally once a day. After the rats are dosed continuously for 15 days, their stomachs are opened along the greater curvature and areas of lesion are measured. The effect of each sample is indicated by the percent of remedial effect, which is calculated by comparison of (A) areas of lesion of the rat given the compound orally and (B) those of the control rat not given the compound. It is found that, in the groups which were orally administered 2.0 g. of aluminum salts of N-acetyl-L-glutamine per kg. of each rate, the remedial effect is striking.

The results are given in the following table.

TABLE

| Compound | Dose, g./kg. | Remedial effect (percent) |
|---|---|---|
| I [1] | 2.0 | 48 |
| II [2] | 2.0 | 7 |
| Control | | 0 |

[1] The compound prepared by the method of Example 1.
[2] N-acetyl-L-glutamine of starting material in Example 1.

What is claimed is:
1. A compound of the formula:

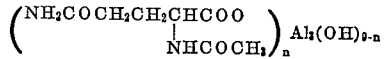

wherein $n$ is from 3 to 9.

2. The compound of claim 1 wherein $n$ is 3.
3. The compound of claim 1 wherein $n$ is 5.

References Cited
UNITED STATES PATENTS 3,497,538　2/1970　Calburn _____ 260—448 R

FOREIGN PATENTS 1,047,911　11/1966　Great Britain _____ 260—448 R
854,934　11/1960　Great Britain _____ 260—448 R
15,353/63　8/1963　Japan _____ 260—448 R HELEN M. S. SNEED, Primary Examiner U.S. Cl. X.R.
424—319